Patented Aug. 26, 1924.

1,506,371

UNITED STATES PATENT OFFICE.

LESTER KIRSCHBRAUN, OF EVANSTON, ILLINOIS.

BITUMINOUS COMPOSITION.

No Drawing. Original application filed May 8, 1915, Serial No. 26,813. Divided and this application filed December 2, 1918. Serial No. 264,903.

*To all whom it may concern:*

Be it known that I, LESTER KIRSCHBRAUN, a citizen of the United States, residing in the city of Evanston, county of Cook, and State of Illinois, have invented certain new and useful Improvements in Bituminous Compositions, of which the following is a specification.

This application is a division of an original application filed May 8th, 1915, Serial #26,813.

This invention relates to improvements in bituminous compositions and refers more particularly to a composition adapted for use in waterproof flooring, coverings, paints and the like, although in its broader aspects the invention is not limited to any specific use.

Among the salient objects of the invention are to provide a waterproof bituminous composition which can be laid cold and which forms a resilient, sanitary, rubbery and durable covering; to provide a composition which can be readily laid without the necessity of heating the material, which quickly and permanently sets, which can be laid without the use of relatively expensive vehicles, such as naphthas, benzene and the like; to provide a construction which can be readily, easily and cheaply formed with a coloring which imparts an ornamental effect as desired; to provide a composition which is easily washed and cleaned or repaired; to provide a composition which in addition to being pliable and suitable for flooring and the like, is also readily adapted for use as a paint.

Describing now the manner of making my improved bituminous composition, I preferably prepare an aqueous paste, which may be prepared by puddling clay or other material which has a substantial percentage of matter of colloidal character. After this paste or vehicle has been worked up to a sufficiently thin consistency, I then add a bitumen in a fluid condition. This bitumen may be either natural or artificial asphalt or a prepared asphaltic cement, coal tar pitch, or pitch such as resin and the like, all of which as is well known, are naturally adhesive at normally atmospheric temperatures. This bitumen may be either used as it is naturally, or with tempering oils, such as petroleum residuum, linseed oil and analogous oils. The bitumen must be first softened by heat to a practically liquid condition. In other words, the bitumen must be sufficiently fluid to properly amalgamate and become intimately associated with the paste particles. The bitumen may be mixed with the paste by stirring the two together until they become thoroughly amalgamated with each other and of course when the aqueous paste is mixed with a molten liquid bitumen, i. e., one which is solid at atmospheric temperature, the paste becomes heated. Preferably, this is done by grinding them together. This mixture forms in effect an emulsified bituminous matrix. Water is then added to this emulsified mixture to further thin it. This could be done for the reason that the water is in the external phase and the particles of bitumen finely dispersed through the water in the internal phase as is well known to those familiar with emulsions. Fibrous filler is then added to the matrix as desired, and thoroughly incorporated with the same. This can be done in a well known form of mixing machine.

The fibrous material may consist of leather waste, paper, wood pulp, or the like. When used as a floor composition, it is spread over the floor in a relatively thin sheet in substantially the same way as Portland cement mortar. It is to be noted that when so used the composition may be spread cold and troweled and finished to a smooth even surface. As the water evaporates, the particles of bitumen attach themselves to the non-bituminous matter and form a unitary structure. When it is not necessary to produce a monolithic structure, a composition may be formed on a suitable support in a relatively thin sheet and the bitumen allowed to coalesce prior to its application to the floor. When used as a waterproof covering such as roofing or siding, the composition may be applied in the way above described.

When used as a paint, it is simply spread over the surface with a brush as is the ordinary paint. Upon the evaporation of the water an insoluble waterproof film is left.

I have heretofore stated that my composition may be given any desired coloring by the addition of a pigment. It should be here said however, that it is preferable, where a bright color is desired, that the bitumen used, be a resin as contra-distinguished for example, from a black asphalt. The resin in this case is softened with wax tailings, linseed oil, or some analogous oils, so that the bituminous cement then prepared shall be colored as little as possible, in order to obtain the full effect of the admixed pigment. The bituminous cement in this case, may be for example, formed of 60 per cent wax tailings and 40 per cent of rosin. Linseed oil may be added to the above mixture and partially or entirely displace the use of wax tailings. In certain cases asphalt might still be used, as for example, when a gray or brown color is desired and this can be obtained by mixing asphalt, wax tailings, and rosin in proportions of 20 per cent asphalt, 30 per cent rosin and 50 per cent wax tailings.

I claim as my invention:

1. A bituminous stock capable of being formed into a relatively thin sheet in an aqueous vehicle and comprising an emulsified matrix formed of a waterproof adhesive bituminous binder and an emulsifying agent and water, the water being in the external phase, and comminuted fibre intimately mixed with said matrix.

2. A bituminous stock capable of being formed into a relatively thin sheet in an aqueous vehicle, comprising an emulsified matrix formed of a waterproof adhesive bituminous binder, clay of colloidal character and water in the external phase.

3. An emulsified matrix capable of being thinned with water and consisting essentially of a waterproof adhesive binder, solid at atmospheric temperature, an emulsifying agent containing colloidal clay and water, the latter constituting the external phase and the binder the internal phase.

4. An emulsified matrix capable of being thinned with water and consisting essentially of a pitchy binder, an emulsifying agent containing colloidal inorganic particles and water, the latter constituting the external phase and the pitchy binder the internal phase.

5. A moist and plastic composition capable of being rendered fluid without the aid of heat and merely by the addition of water thereto, made of bitumen (pitch), brought to a fluid condition by heat, an argilliferous substance brought to a fluid condition by water the two fluids being mixed while heated and being thoroughly stirred until emulsified, the heat being such that the moisture is not driven off or evaporated from the mixture.

6. A moist and plastic composition capable of being rendered fluid without the aid of heat and merely by the addition of water thereto, made of bitumen brought to a fluid condition, an argilliferous substance brought to a fluid condition by water the two fluids being mixed until emulsified, the heat being such that the moisture is not driven off or evaporated from the mixture.

7. A moist and plastic composition capable of being rendered fluid without the aid of heat and merely by the addition of water thereto, made of bitumen brought to a fluid condition, an argilliferous substance brought to a fluid condition by water the two fluids being mixed until emulsified.

8. A moist and plastic composition capable of being rendered fluid without the aid of heat and merely by the addition of water thereto, made of bitumen brought to a fluid condition by heat, an argilliferous substance brought to a fluid condition by water, the two fluids being mixed until emulsified.

9. An emulsified matrix consisting of a solid bitumen which liquefies when heated, an argilliferous substance and water, all thoroughly emulsified, the bitumen constituting the disperse phase of the emulsion and the non-adhesive matrix possessing the property of being thinned by the application of water to the emulsion without the aid of heat.

10. A moist and plastic composition made of a non-liquid bitumen brought to a fluid condition, an argilliferous substance brought to a fluid condition by water, the two fluids being mixed until emulsified, and an additional quantity of water then incorporated with the materials to render the composition fluid without the addition of heat.

11. An emulsion of bitumen dispersed in an aqueous medium containing clay, said bitumen being of a consistency normally solid at ordinary atmospheric temperatures so as to require liquefaction by heat to permit emulsification thereof, the bitumen becoming substantially solid in the finished emulsion at normal atmospheric temperatures and being finely dispersed therein.

12. An emulsion composed of bitumen dispersed in an aqueous medium containing clay and capable of being used without the aid of heat, the bitumen in the emulsion being solid at normal atmospheric temperatures so as to require liquefaction by heat to permit emulsification and dispersion thereof, said bitumen being solid in the finished emulsion at normal atmospheric temperatures.

13. A bituminous stock capable of being formed into a relatively thin sheet in an aqueous vehicle, comprising an emulsified matrix formed of a waterproof adhesive bituminous binder, solid at atmospheric temperature, and of such a character as to require liquefaction by heat for the purpose of emulsification, clay of colloidal character and water in the external phase.

14. An emulsified matrix capable of being thinned with water and consisting essentially of a pitchy binder solid at atmospheric temperature, and of such a character as to require liquefaction by heat for the purpose of emulsification, an argillaceous emulsifying agent and water, the latter constituting the external phase and the pitchy binder the internal phase.

LESTER KIRSCHBRAUN.